3,328,880
SILICIOUS DENTAL FILLING

Joseph H. Schlesinger, New York, N.Y., assignor to
Eagle Chemical Co., New York, N.Y.
No Drawing. Filed May 27, 1966, Ser. No. 553,285
3 Claims. (Cl. 32—15)

The invention relates to silicious dental cements, particularly to the product and method of use for such cements to give improved results.

The dental cement that is at the present in extensive use is the silica. In compounding the cement for a silicious dental cement filling a silicious powder and a modified phosphoric acid is used to produce a plastic cement, which is to mold to the tooth cavity. The phosphoric acid and the cement powder produces the cement mix, and the acidity serves as the hardening medium for the cement filling.

It is well known that the atmospheric conditions, temperatures and humidity have great influence on the behavior of the phosphoric acid used when the cement is mixed on the slab for attaining the proper consistency for the filling. Because phosphoric acids generally are hygroscopic.

When the proper consistency of the mix is attained, the plastic mix is pressed into the tooth cavity, where the cement commences to set, and not before it is inserted into the cavity.

There is no way of knowing in advance by the operator how the cement is going to perform in the mix before the mix is completed; then it may be too late.

For example, when the setting of a cement mix commences before the proper consistency is completed on the slab, there is no way of retarding the reaction. The mix must be discarded. There is only one thing positive in such an act, that the cement reacts and commences to set sooner than anticipated, despite the directions which accompany the ingredients of the cement.

In common practice, silicious cement fillings are prepared by mixing a powdered mass containing kaolin and kindred silicate with a suspending medium preferably a solution of orthophosphoric or other phosphoric acids to which oxides of aluminum or calcium have been added. The mixture when of proper plastic consistency is pressed into the tooth cavity.

To overcome the presetting of the cement mix on the slab before the proper consistency of the mix is attained, the improvement comprises the use of two liquids for producing a silicious dental filling. The first liquid is to be for producing the cement mix. The cement will not commence to set until the second liquid, the hardening liquid for the cement mix, is added to the mix at the completion of the mix. Thereby the presetting of the cement mix on the slab is controlled. To attain these features a silica ester can be used, and will not cause setting of the mix and will remain liquid at ordinary temperatures. It is decomposed by water or acid with a production of a colloid silica acid or silica and is compatible with the use in the mouth. Examples of silica ester that meet these requirements and that illustrate the class of compounds that may be used are diethyl silicate, tetra ethyl silicate and dimethyl silicate.

The matter of obtaining the proper consistency for the silicious cement has received substantial attention in clinics and has been treated in journalism, learned and prolific articles.

It is generally believed that the more cement powder is added to the mix the stronger the filling will be. Up to a point this is true. A thin mix does not produce a strong filling, as one of proper consistency. Adding powder until the mix has a putty-like stiffness does not produce a corresponding increase in strength.

The determining factor of strength of the silicious cement filling depends upon the quantity of silica contained in the powder.

Since the cement powder contains a fixed amount of silica, it cannot be altered. Therefore to increase the silica contents in the cement mix, the improvement comprises, for example, using liquid ethyl silica for the cement mix. Thereby the silica content is increased in the cement mix.

Furthermore, since the cement mix produced will not harden, therefore the operator attains time for producing and controlling the consistency of the cement mix and the hardening liquid for the mix, the phosphoric acid is added to the mix at the completion of the mix and not before.

Still furthermore: In the prior art it has been necessary that the cavity is dry for receiving the acidic silicious dental cement filling. According to the present invention, it is of cardinal importance that the cavity be moist to receive the ethyl silicate, whereby a gelatinous silica is produced in the cavity over which the acid exuding silicious dental filling is applied. The gelatinous silica is produced first over the cavity surface, serving as a barrier against acid penetration into the tooth. Thereby pulp irritation is restrained.

Still furthermore: Since the inserted cement filling in the cavity contains a liquid silicate ester it turns into an adhesive gelatinous colloid within the body of the cement. Thereby providing a matrix and fixing a silica binder within the filling, for the small divided particles in the cement mix after hardening. This leaves a tenacious bond of pure silica in the filling. Thus strength, toughness and flexibility of the filling is increased, porosity, brittleness and ingress of liquid into the filling is decreased.

The bonding agent of pure silica has many advantages. It is insoluble in water, it is acid proof without any chemical action upon the surrounding tissue and material, it is neutral in pH and has a permanent transparency. Overall it increases the protection of the tooth over a long period of use.

The esters used may be employed in substantially pure liquid form and are used in that condition. However, they are preferably used in the form of a solution in organic solvent as, for instance, one of the lower alcohols.

The action of the silica esters in contact with the cavity surface of the tooth and also in contact with the silicious dental cement will be explained in greater detail by taking tetraethyl silicate for example.

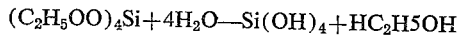

The orthosilicic acid is a gelatinous colloidal adhesive which quickly forms in the tooth cavity. It gradually loses moisture as follows:

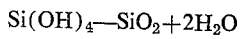

As it loses moisture, it hardens, consequently the application over a layer of the silicate of dental cement results in the production of a bond not obtainable in any other way.

It will be understood also that it is intended to cover all changes and modifications of the example of the invention herein for the purpose of illustration which do not constitute departures from the spirit and scope of the invention.

I claim:
1. In the process of filling a moist tooth cavity in the mouth of a patient with a silicious dental cement filling comprising powdered silicious material and phosphoric acid, the improvement comprising mixing said powdered silicious materials with an amount of a liquid silicate ester sufficient to produce a paste of proper consistency and thereafter adding phosphoric acid, whereby the cement mixture will not set until the phosphoric acid is added thereto; the liquid silicate ester also increasing the silica content of the filled.

2. In the process of filling a moist tooth cavity in the mouth of a patient with silicious dental cement, comprising powdered silicious materials and ethyl silicate and phosphoric acid, the improvement comprising mixing said produced powdered silicious material with an amount of the liquid silica ester sufficient to produce a paste, and after mixing adding phosphoric acid to the mix, and thereafter immediately placing the mix in the tooth cavity.

3. The process of claim 2 including the step of coating the moist tooth cavity with a liquid silicate ester, and thus producing a gelatinous silica coat over the cavity surface, prior to placing the cement therein.

References Cited

UNITED STATES PATENTS 3,247,593   4/1966   Schlesinger _____ 106—35 XR

ALEXANDER H. BRODMERKEL, *Primary Examiner.*

DONALD J. ARNOLD, *Examiner.*

L. HAYES, *Assistant Examiner.*